US008847510B2

(12) United States Patent
Pan

(10) Patent No.: US 8,847,510 B2
(45) Date of Patent: Sep. 30, 2014

(54) LED AC DRIVING CIRCUIT CAPABLE OF ADJUSTING OPERATING VOLTAGE

(71) Applicant: Luxul Technology Incorporation, New Taipei (TW)

(72) Inventor: Cheng-Hung Pan, New Taipei (TW)

(73) Assignee: Luxul Technology Incorporation, New Taipei (TW)

( * ) Notice: Subject to any disclaimer, the term of this patent is extended or adjusted under 35 U.S.C. 154(b) by 91 days.

(21) Appl. No.: 13/739,179

(22) Filed: Jan. 11, 2013

(65) Prior Publication Data

US 2013/0187549 A1  Jul. 25, 2013

(30) Foreign Application Priority Data

Jan. 20, 2012  (TW) .............................. 101102573 A
Feb. 6, 2012  (TW) .............................. 101103735 A

(51) Int. Cl.
*H05B 37/02*  (2006.01)
*H05B 33/08*  (2006.01)

(52) U.S. Cl.
CPC ............ *H05B 37/02* (2013.01); *H05B 33/0812* (2013.01); *Y02B 20/345* (2013.01)
USPC ............................ 315/291; 315/224; 315/307

(58) Field of Classification Search
CPC ...... Y02B 20/00; Y02B 20/30; Y02B 20/341; Y02B 20/345; Y02B 20/346; H05B 37/00; H05B 37/02; H05B 33/00; H05B 33/02; H05B 33/08; H05B 33/0803; H05B 33/0806; H05B 33/0809; H05B 33/0812; H05B 33/0815; H05B 33/0821; H05B 33/0842
USPC ................. 315/119, 121, 123, 224, 291, 307; 315/185 R, 193
See application file for complete search history.

(56) References Cited

U.S. PATENT DOCUMENTS 8,274,237 B2 *  9/2012  Nagase et al. ................ 315/247
8,400,079 B2 *  3/2013  Kanamori et al. ............ 315/307
8,502,461 B2 *  8/2013  Shiu et al. ..................... 315/192

* cited by examiner

*Primary Examiner* — David H Vu
(74) *Attorney, Agent, or Firm* — Rosenberg, Klein & Lee

(57) ABSTRACT

An LED AC driving circuit capable of adjusting operating voltage has a rectifying unit, an LED unit, a voltage-controlled transistor, a current detecting unit and a current regulating unit to form a power loop. Further, a resistance adjusting unit is connected to the voltage-controlled transistor in parallel. The current regulating unit detects the operating power of the voltage-controlled transistor. When the detected operating power is zero, the resistance of the resistance adjusting unit is increased for increasing the current flowing through the voltage-controlled transistor. When the detected operating power becomes larger than a maximum rated power, the resistance of the resistance adjusting unit is decreased to reduce the current. Thus, the operating power is maintained between zero and the maximum rated power.

20 Claims, 11 Drawing Sheets

LED AC DRIVING CIRCUIT CAPABLE OF ADJUSTING OPERATING VOLTAGE

CROSS-REFERENCE TO RELATED APPLICATIONS

This application claims the benefit of Taiwan patent application No. 101102573, filed on Jan. 20, 2012, and Taiwan patent application No. 101103735, filed on Feb. 6, 2012, the disclosures of which are incorporated herein in their entirety by references.

BACKGROUND OF THE INVENTION

1. Field of the Invention

The present invention relates to an LED AC driving circuit, particularly an LED AC driving circuit capable of adjusting an operating voltage.

2. Description of the Prior Art

LED lights as the popular and common lighting devices have the advantages of high illumination efficiency and low power consumption in comparison to the incandescent light. Limited by the one-way driving characteristic of the LED, the LED lights cannot be connected to AC sockets directly. One of the conventional LED AC driving circuits as shown in FIG. 9 is proposed to overcome the limitation.

The LED AC driving circuit comprises a rectifying unit 20, an LED unit 21, a voltage-controlled transistor 22, a current detecting unit 23, a low frequency filter 24 and a current regulating unit 25.

The rectifying unit 20 receives and converts AC power to pulsed DC power. The LED unit 21 is comprised of multiple LEDs and connected to the rectifying unit 20 to form a power loop. The voltage-controlled transistor 22 is connected in the power loop for adjusting a loop current flowing through the power loop. The current detecting unit 23 is connected in the power loop for converting the loop current to a voltage signal. The low-frequency filter 24 electrically connects to the current detecting unit 23 and outputs a voltage based on the voltage signal from the current detecting unit 23. The current regulating unit 25 has input terminals connecting to low-frequency filter 24 and a reference voltage (Vref), and an output connecting to the voltage-controlled transistor 22. The current regulating unit 25 outputs a control signal to the voltage-controlled transistor 22 according to a comparison result of the reference voltage (Vref) and the voltage for stabilizing the loop current.

In short, the rectifying unit 20 converts the AC power, which cannot be directly applied to the LED, to pulsed DC power. The current detecting unit 23 and the low frequency filter 24 detect the loop current flowing through the LED unit 21. The current regulating unit 25 controls the voltage-controlled transistor 22 to adjust the loop current for maintaining the normal operation of the LED unit 21.

However, the voltage-controlled transistor 22 may encounter the problem of over-heating because it is connected in the power loop and sustains a large power. Therefore, a shunt resistor 26 can be connected in parallel to the voltage-controlled transistor 22 to solve the problem.

With further reference to FIGS. 10 and 11, although the shunt resistor 26 is able to share the power of the voltage-controlled transistor 22 to mitigate the extent of heat accumulation, the shunt resistor 26 in another aspect limits the maximum operating voltage across the voltage-controlled transistor 22. As an example, if the loop current is 0.16 ampere and the rated power of the voltage-controlled transistor 22 is 1 watt, the maximum operating voltage across the voltage-controlled transistor 22 will be limited at 24 volts when the resistance of the shunt resistor 26 is 150 ohms. However, when the operating voltage of the voltage-controlled transistor 22 needs to be increased over 24 volts, the current passing through the voltage-controlled transistor 22 will become zero. The voltage-controlled transistor 22 eventually loses its current regulating function. Therefore, it seems that the conventional AC LED driving circuit is unsuitable for particular applications with high operating voltages.

To overcome the shortcomings, the present invention provides an LED AC driving circuit capable of adjusting the operating voltage to mitigate or obviate the aforementioned problems.

SUMMARY OF THE INVENTION

The main objective of the present invention is to provide an LED AC driving circuit that is capable of adjusting operating voltage and suitable for circuits requiring high voltage.

The LED AC driving circuit comprises:

a rectifying unit receiving and converting AC power to pulsed DC power and output the pulsed DC power through an output;

an LED unit connected to the output of the rectifying unit to form a power loop and comprising multiple LEDs;

a voltage-controlled transistor for adjusting a loop current of the power loop, wherein the voltage-controlled transistor connects to the power loop in series and has a control terminal;

a current detecting unit connecting to the power loop in series and converting the loop current to a voltage signal;

a low frequency filter connecting to the current detecting unit and outputting an voltage based on the voltage signal;

a resistance adjusting unit connecting to the voltage-controlled transistor and being capable of adjusting a resistance across the voltage-controlled transistor;

a current regulating unit having
  an input terminal receiving the voltage from the low frequency filter;
  a reference input terminal receiving a reference voltage; and
  an output terminal connected to the control terminal of the voltage-controlled transistor;

wherein the current regulating unit compares the voltage from the low frequency filter with the reference voltage to produce a control signal applied to the control terminal of the voltage-controlled transistor for stabilizing the loop current, and detects operating power of the voltage-controlled transistor for controlling the resistance adjusting unit to change the resistance across the voltage-controlled transistor.

With the foregoing circuit configuration, the current regulating unit will continuously detect the operating power of the voltage-controlled transistors and adjust the resistance of the resistance adjusting unit based on the detected result. In one aspect, the current through the voltage-controlled transistor will be increased when the operating power is zero. In another aspect, the current through the voltage-controlled transistor will be decreased when the operating power is larger than the maximum rated power. By properly adjusting the resistance, the operating power can be maintained between zero and the maximum rated power.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
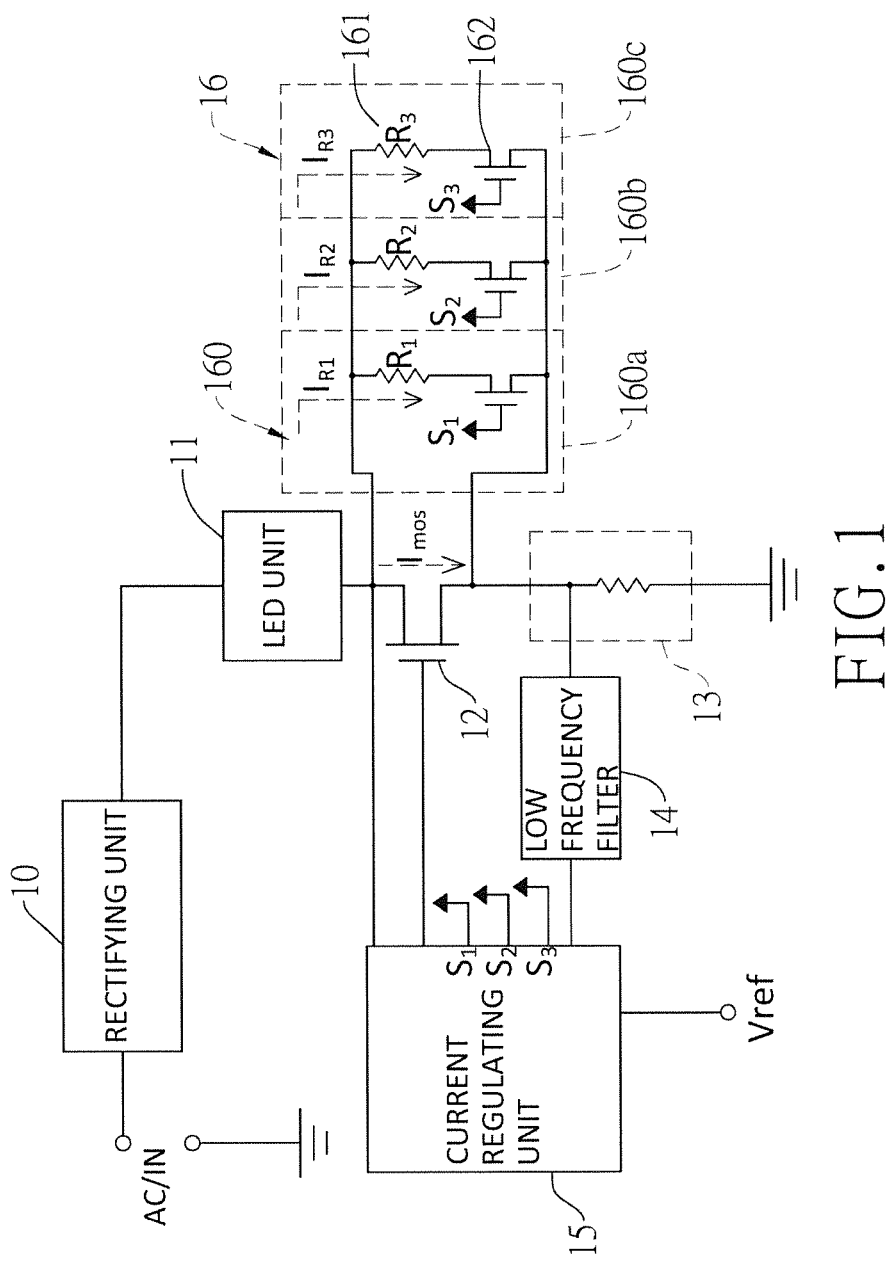
FIG. 1 shows a circuit diagram of a first preferred embodiment of an LED AC driving circuit of the present invention.

With reference to FIG. 1, an LED AC driving circuit in accordance with the present invention comprises a rectifying unit 10, an LED unit 11, a current detecting unit 13, a low-frequency filter 14, a current regulating unit 15 and a resistance adjusting unit 16.

The rectifying unit 10, being a full wave rectifying circuit or a half wave rectifying circuit, receives and converts AC power to pulsed DC power. In the preferred embodiment described hereinafter, the rectifying unit 10 is a full wave rectifying circuit.

The LED unit 11 is connected to the rectifying unit 10 to receive the pulsed DC power and form a power loop. The LED unit 11 comprises multiple LEDs connected in series or in parallel and driven by the pulsed DC power.

The voltage-controlled transistor 12 for controlling a loop current $I_{MOS}$ that flows through the power loop is connected in series on the power loop and has a control terminal. The voltage-controlled transistor 12 can be a MOSFET as described in the following or a BJT. For a MOSFET, its gate pin is used as the control terminal and the drain and source are connected in series on the power loop. The loop current $I_{MOS}$ through the drain and the source is determined by a voltage across the gate and the source.

The current detecting unit 13 is connected to the voltage-controlled transistor 12 in series and also on the power loop. The current detecting unit 13 may be a resistor for producing a voltage signal in response to the loop current $I_{MOS}$.

The low-frequency filter 14 has an input connected to a node where the voltage-controlled transistor 12 and the current detecting unit 13 are connected in series for receiving the voltage signal from the current detecting unit 13. The low-frequency filter 14 generates a voltage corresponding to an average value of the loop current $I_{MOS}$. The low frequency 14 may be an analog filter comprised of capacitors and inductors, or a digital filter comprised of digital circuits. In this embodiment, the low-frequency filter 14 is a digital filter such as a down-sampling filter to sample the voltage signal and producing the voltage corresponding to the average value of the loop current $I_{MOS}$.

The resistance adjusting unit 16 is connected in parallel to the voltage-controlled transistor 12 for adjusting a resistance across the resistance adjusting unit 16.

The current regulating unit 15 is connected to the power loop and the resistance adjusting unit 16. The current regulating unit 15 includes an input terminal connected to the output of the low frequency filter 14, a reference input terminal receiving a reference voltage Vref, and an output terminal connected to the control terminal of the voltage-controlled transistor 12.

The current regulating unit 15 compares the voltage from the low frequency filter 14 with the reference voltage Vref. The current regulating unit 15 outputs a control signal to the voltage-controlled transistor 12 to reduce the loop current $I_{MOS}$ if the voltage is greater than the reference voltage Vref. Otherwise, the current regulating unit 15 outputs a control signal to the voltage-controlled transistor 12 to increase the loop current $I_{MOS}$. Therefore, the loop current $I_{MOS}$ can be maintained in a stable state.

The current regulating unit 15 also detects the power consumption of the voltage-controlled transistor 12 and changes the resistance of the resistance adjusting unit 16 based on the detected result. The resistance of the resistance adjusting unit 16 will be increased to increase the loop current $I_{MOS}$ through the voltage-controlled transistor 12 when the detected power consumption is zero. In another aspect, the resistance of the adjusting unit 16 will be reduced to lower the loop current $I_{MOS}$ when the detected power consumption is greater than the maximum rated power.

The resistance adjusting unit 16 in the following embodiments comprises multiple current-shunting units 160. Each current-shunting unit 160 has a control transistor 162 and a shunt resistor 161.

The control transistor 162 has a control terminal. In this embodiment, the control transistor is an MOSFET with a drain, a source, and a gate as the control terminal.

The shunt resistor 161 is connected to the control transistor 162 in series. In this embodiment, one end of the shunt resistor 161 is connected to the drain of the control transistor 162. The sources of both the control transistor 162 and the voltage-controlled transistor 12 are connected together.

The current regulating unit 15 described in the following embodiments comprises a detecting terminal connected to the power loop, and multiple switching terminals respectively connected to the control terminals of the control transistors 162 for turning on/off the control transistors 162.

In the following embodiments, the most common conditions are taken as examples. To operate normally, the power loop requires a current of 0.16 amps. The voltage-controlled transistor 12 is capable of sustaining a high voltage of 35 volts at most, and its maximum rated power is 1 watt.

With reference to the first embodiment as shown in FIG. 1, the resistance adjusting unit 16 comprises a first, a second, and a third current-shunting unit 160a-160c connected in parallel. The resistances values R1-R3 of the three shunt resistors 161 are respectively 150, 180 and 220 ohms. Each shunt resistor 161 connects its first end to the respective control transistor 162, and its second end to the drain of the voltage-controlled transistor 12. The sources of all the control transistors 162 and the voltage-controlled transistor 12 are connected together.

In the first embodiment, the detecting terminal of the current regulating unit 15 is connected to the node between the LED unit 11 and the voltage-controlled transistor 12. The current regulating unit 15 calculates the operating power of the voltage-controlled transistor 12 by referring to the operating voltage of the voltage-controlled transistor 12 currently detected at the detecting terminal, and also referring to the present resistance provided by the resistance adjusting unit 16.

Figure 4:
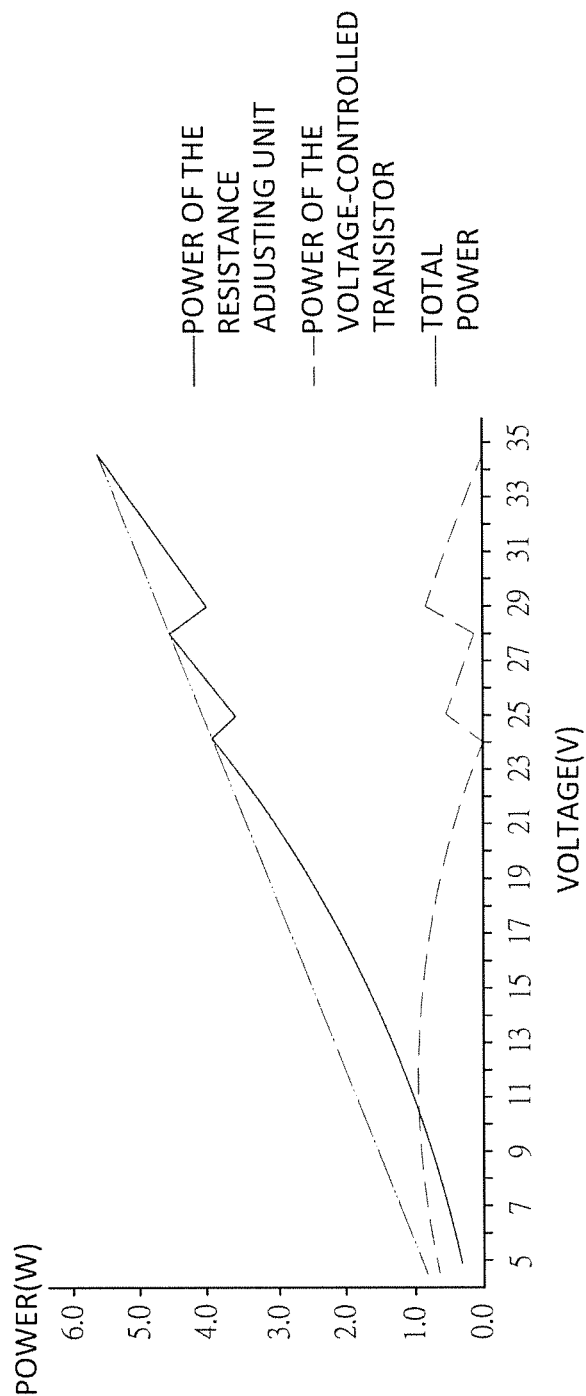
FIG. 4 shows different waveforms respectively indicating power of a resistance adjusting unit, power of a voltage-controlled transistor, and a total power in accordance with the present invention.

As shown in FIG. 4, when the initial resistance provided by the resistance adjusting unit 16 equals the resistance value R1 of the first current-shunting unit 160a, only the control transistor 162 of the first current-shunting unit 160a is turned on and other control transistors 162 are turned off. When the operating voltage of the voltage-controlled transistor 12 is increased to 24 volts and the operating power approximates to zero, the current regulating unit 15 deactivates the first current-shunting unit 160a and activates the second current-shunting unit 160b instead. By enabling the second current-shunting unit 160b, the resistance adjusting unit 16 provides a larger resistance across the voltage-controlled transistor 12 to prevent the voltage-controlled transistor 12 from cutting off. The voltage-controlled transistor 12 remains in the normal operation. When the operating voltage of the voltage-controlled transistor 12 further increases to 28 volts, the second current-shunting unit 160b is deactivated and the third current-shunting unit 160c is activated instead. Therefore, the operating voltage of the voltage-controlled transistor 12 can be increased just by choosing a proper resistance of the resistance adjusting unit 16.

The operating voltage of the voltage-controlled transistor 12 can be easily derived by referring to working voltages of other units on the power loop. Therefore, connecting the detecting terminal of the current regulating unit 15 to other nodes on the power loop is practicable, instead of limiting at the node between the LED unit 11 and the voltage-controlled transistor 12.

Figure 2:
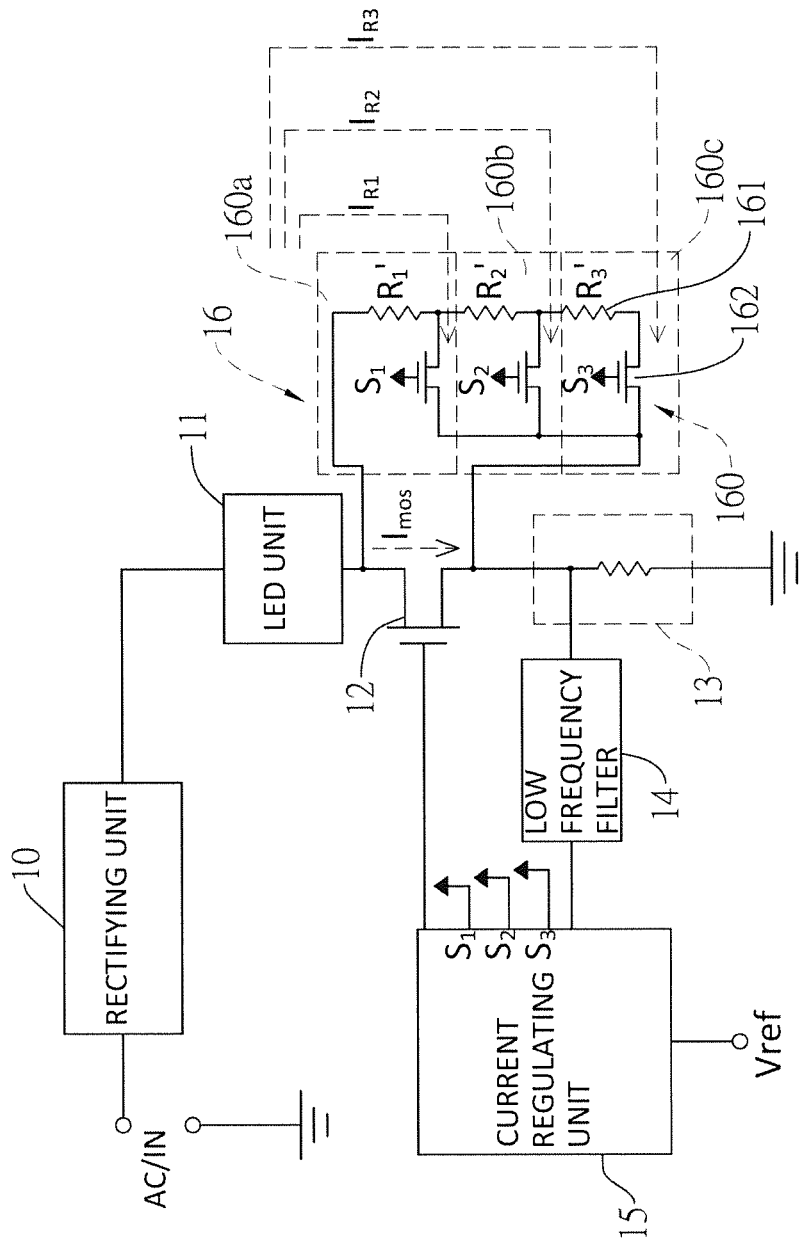
FIG. 2 shows a circuit diagram of a second preferred embodiment of an LED AC driving circuit of the present invention.

With reference to the second embodiment as shown in FIG. 2, the three shunt resistors 161 are connected in series. The first shunt resistor is connected between both the drains of the voltage-controlled transistor 12 and the control transistor 162 of the first current-shunting unit 160a. The second shunt resistor is connected between both the drains of the two control transistors 162 of the first and second current-shunting units 160a, 160b. The third shunt resistor is connected between both the drains of the two control transistors 162 of the second and third current-shunting units 160b, 160c.

All the sources of the control transistors 162 are connected to the source of the voltage-controlled transistor 12. The resistance values R1-R3 of the three shunt resistors 161 are respectively 150, 30 and 40 ohms.

In the second embodiment, the input terminal of the current regulating unit 15 also acts as the detecting terminal thereof. When the operating voltage of the voltage-controlled transistor 12 is increased to a high level and no current passes through the voltage-controlled transistor 12, the voltage-controlled transistor 12 is in cut-off and fails to function. The current passing through the current detecting unit 13 increases to cause a high voltage at the input terminal of the current regulating unit 15. Therefore, the current regulating unit 15 can determine whether the operating power of the voltage-controlled transistor 12 is zero based on the detected voltage level at the input terminal.

Further referring to FIG. 4, when the initial resistance provided by the resistance adjusting unit 16 equals the resistance value R1 of the first current-shunting unit 160a, only the control transistor 162 of the first current-shunting unit 160a is turned on and other control transistors 162 are turned off. Further, the detected voltage at the input terminal of the current regulating unit 15 is assumed to be approximately 400 mV.

When the operating voltage of the voltage-controlled transistor 12 is increased to 24 volts, the detected voltage becomes larger than 400 mV due to the cut-off of the voltage-controlled transistor 12. The current regulating unit 15 deactivates the first current-shunting unit 160a and activates the second current-shunting unit 160b instead to connect the first and second shunt resistors in series. By enabling the second current-shunting unit 160b, the resistance adjusting unit 16 provides a larger resistance across the voltage-controlled transistor 12 to prevent the voltage-controlled transistor 12 from cutting off. The voltage-controlled transistor 12 remains in the normal operation.

When the operating voltage of the voltage-controlled transistor 12 further increases to 28 volts, the detected voltage becomes larger than 400 mV again. The second current-shunting unit 160b is deactivated and the third current-shunting unit 160c is activated instead to increase the resistance. In short, the operating voltage of the voltage-controlled transistor 12 can be increased by simply choosing the proper resistance of the resistance adjusting unit 16.

Because the current flowing through the voltage-controlled transistor 12 is controlled by the output terminal of the current regulating unit 15, the output terminal may act as the detecting terminal, i.e. determining whether the operating power of the voltage-controlled transistor 12 is zero or not based on the voltage at the output terminal.

The foregoing embodiments described situations that the voltage-controlled transistor 12 encounters a problem of zero operating power. The following embodiments will address how to adjust the resistance if the operating power of the voltage-controlled transistor 12 is beyond the maximum rated power.

Figure 3:
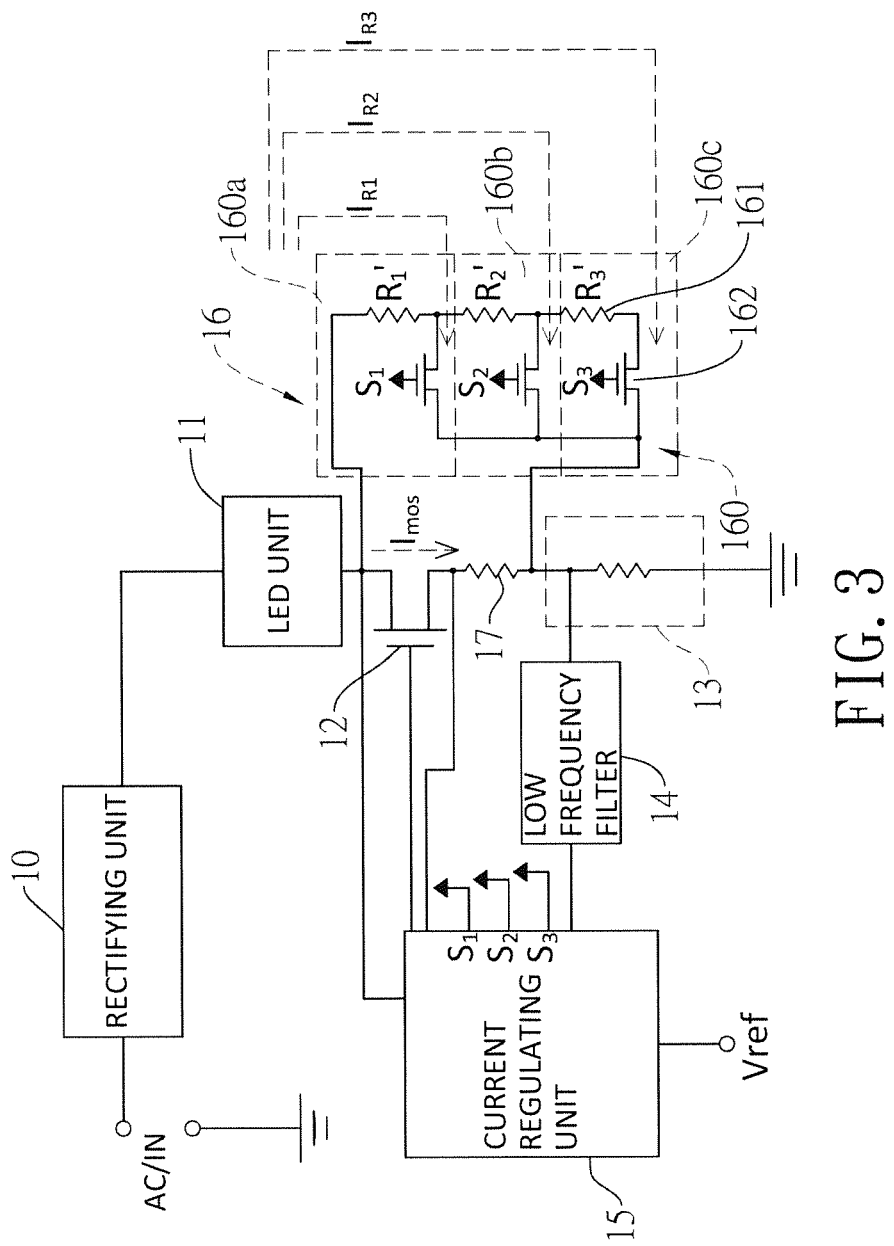
FIG. 3 shows a circuit diagram of a third preferred embodiment of an LED AC driving circuit of the present invention.

With reference to the third embodiment as shown in FIG. 3, a power detecting resistor 17 is added between the LED unit 11 and the current detecting unit 13. The current regulating unit 15 further has a second detecting terminal and a third detecting terminal. The second detecting terminal is connected to a node between the voltage-controlled transistor 12 and the power detecting resistor 17. The third detecting terminal is connected to another node between the LED unit 11 and the voltage-controlled transistor 12.

The second input terminal and the third input terminal are connected to the voltage-controlled transistor 12 in parallel to detect the operating voltage of the voltage-controlled transistor 12. Because the power detecting resistor 17 is connected in series to the voltage-controlled transistor 12, the current going through the voltage-controlled transistor 12 is detectable at the detecting terminal. The current-regulating unit 15 can calculate the operating power based on the detected voltage and current. Once the operating power increases to the maximum rated power, the current-regulating unit 15 will control the resistance adjusting unit 16 to reduce the resistance to keep the voltage-controlled transistor 12 operating normally.

Figure 8:
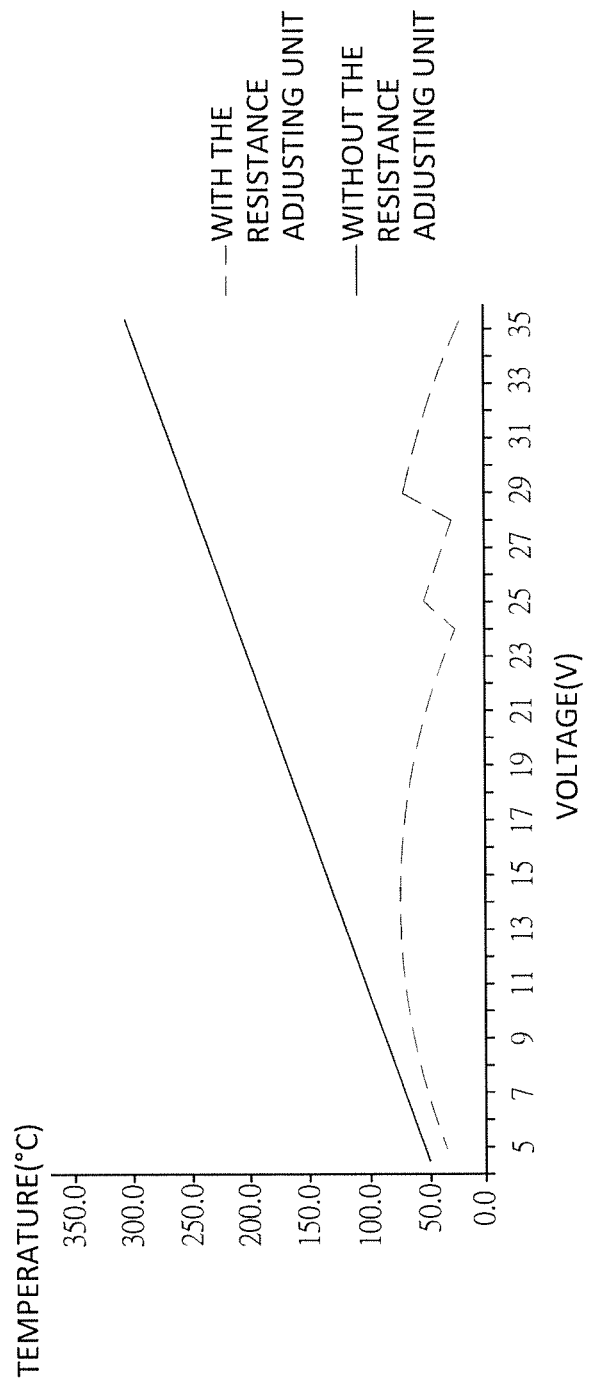
FIG. 8 shows temperature curves of the LED AC driving circuit of the present invention and the conventional LED AC driving circuit.
Figure 9:
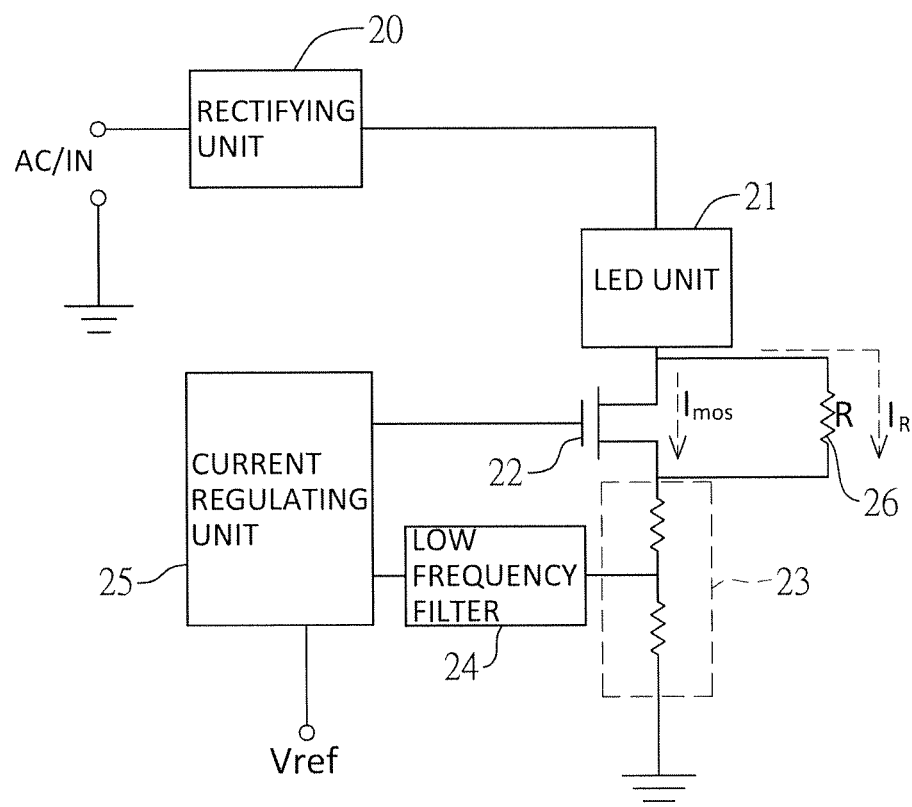
FIG. 9 shows a circuit diagram of a conventional LED AC driving circuit.
Figure 10:
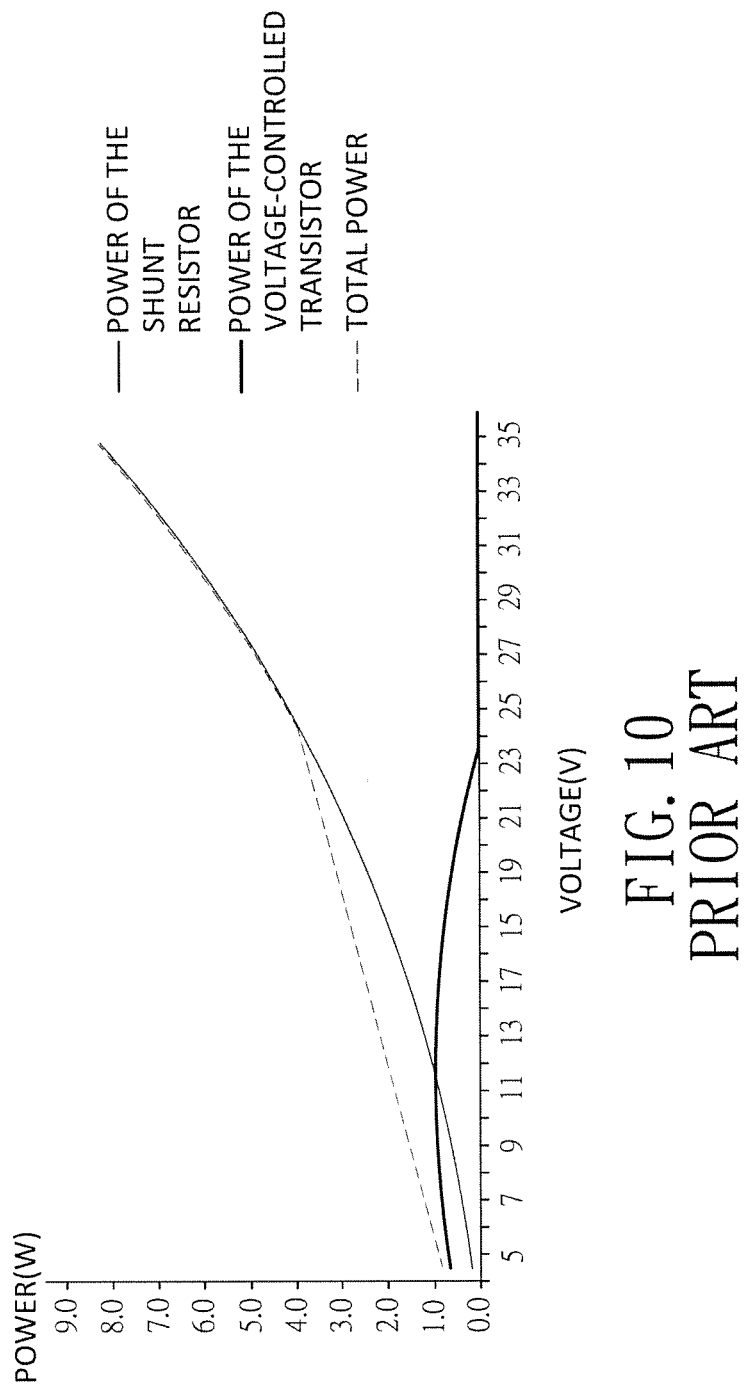
FIG. 10 shows multiple waveforms respectively indicating power of a shunt resistor, power of a voltage-controlled transistor, and a total power in accordance with the LED AC driving circuit on FIG. 9.
Figure 11:
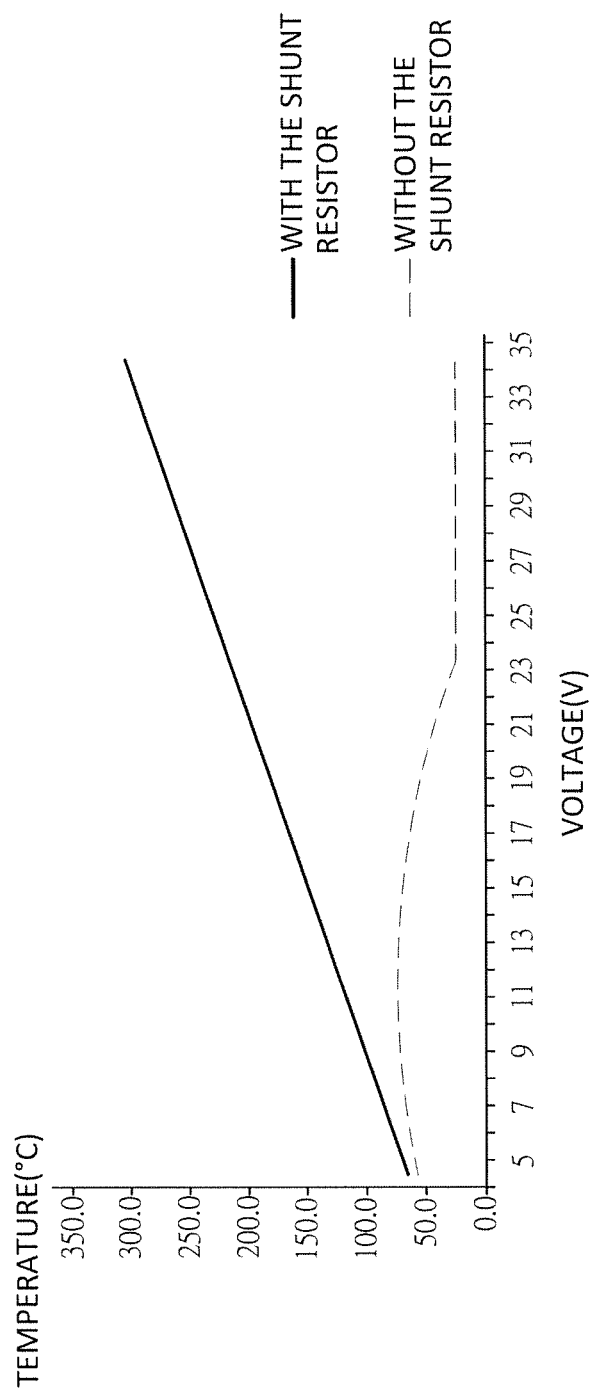
FIG. 11 shows two curves respectively indicating the temperature of the voltage-controlled transistor with a shunt resistor, and the temperature of the voltage-controlled transistor without a shunt resistor in accordance with the prior art.

With reference to FIG. 8, the temperature coefficient is assumed as 50□/W. The temperature of the voltage-controlled transistor 12 cooperated the resistance adjusting unit 16 in accordance with the present invention is limited under 80□. However, the temperature of the voltage-controlled transistor 12 without the resistance adjusting unit 16 will increase rapidly, even to higher than 150□.

In summary, the present invention controls the operating power of the voltage-controlled transistor by changing the resistance of the resistance adjusting unit. Even though the operating voltage of the voltage-controlled transistor is getting higher, the operating power still remains between zero and the maximum rated power. Thus, the present invention can be applied in the circuits using high voltage.

Figure 5:
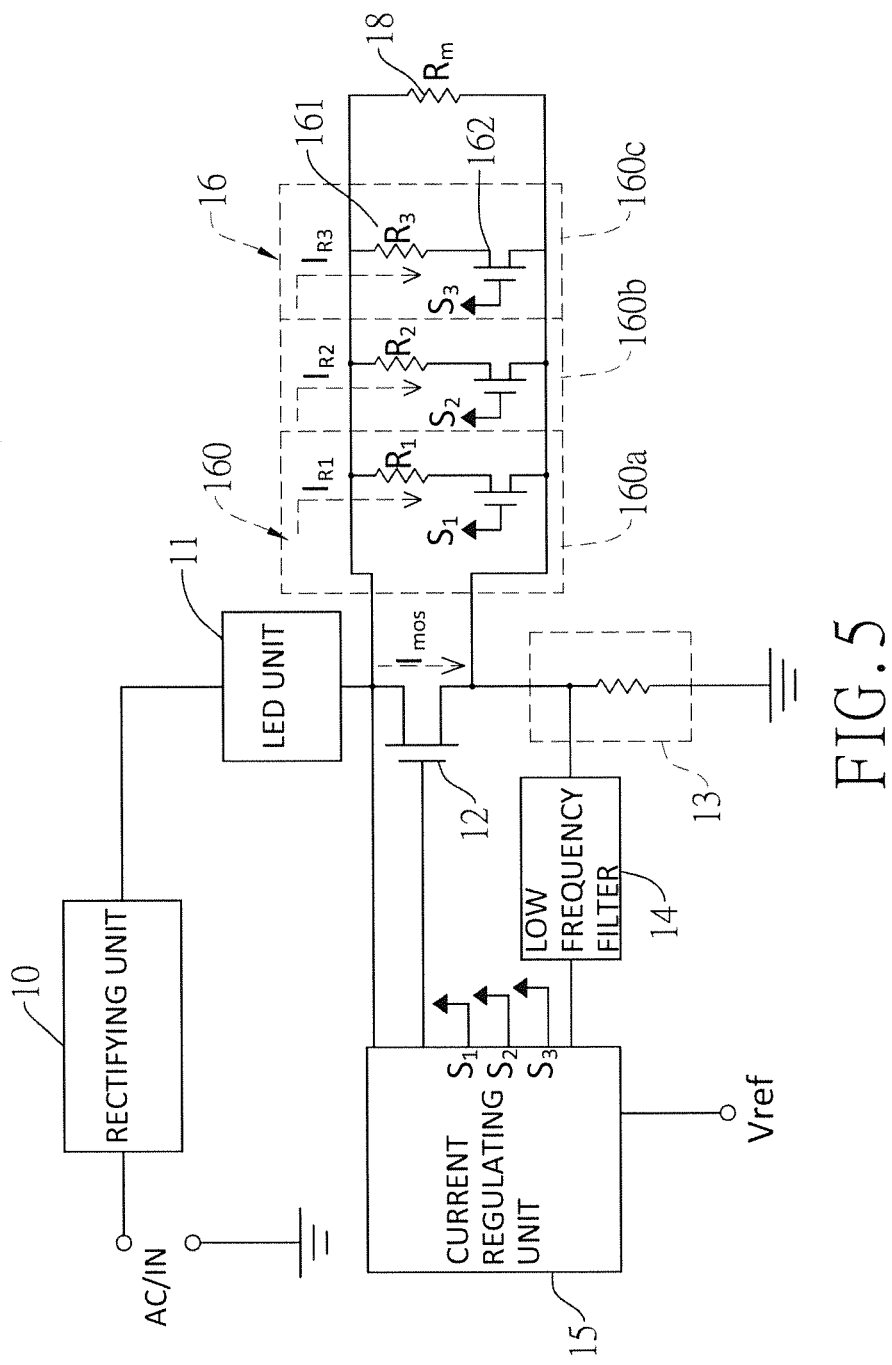
FIG. 5 shows a circuit diagram of a fourth preferred embodiment of an LED AC driving circuit of the present invention, wherein a by-pass resistor is connected to a resistance adjusting unit in parallel in accordance with the present invention.

With reference to FIG. 5, a fourth embodiment further includes a by-pass resistor 18 connected in parallel to the voltage-controlled transistor 12 and the resistance adjusting unit 16 to provide a current by-pass path, wherein the current flowing through the by-pass resistor 18 must be greater than that flowing through the LED unit 11. In addition, a cut-off voltage is set in the current regulating unit 15. When the voltage of the power loop is greater than the cut-off voltage, the current regulating unit 15 will turn off the voltage-controlled transistors 12.

Figure 6A:
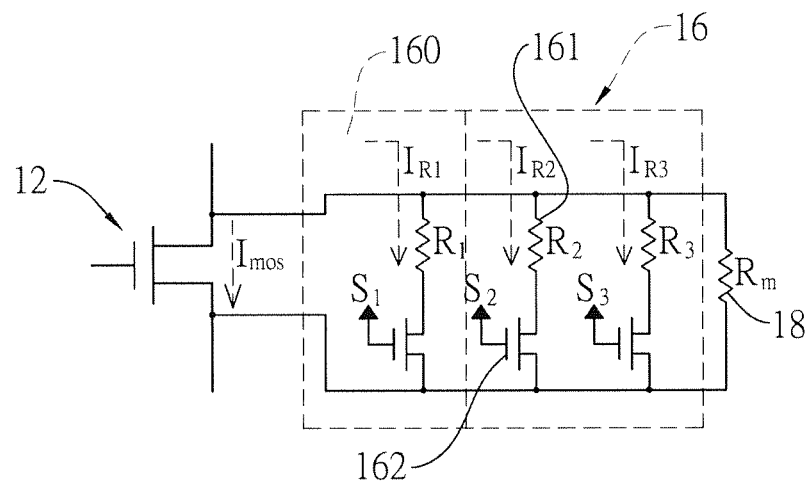
FIG. 6A shows the currents of the fourth embodiment of FIG. 5, wherein the voltage-controlled transistor and the control transistors are not turned off.
Figure 6B:
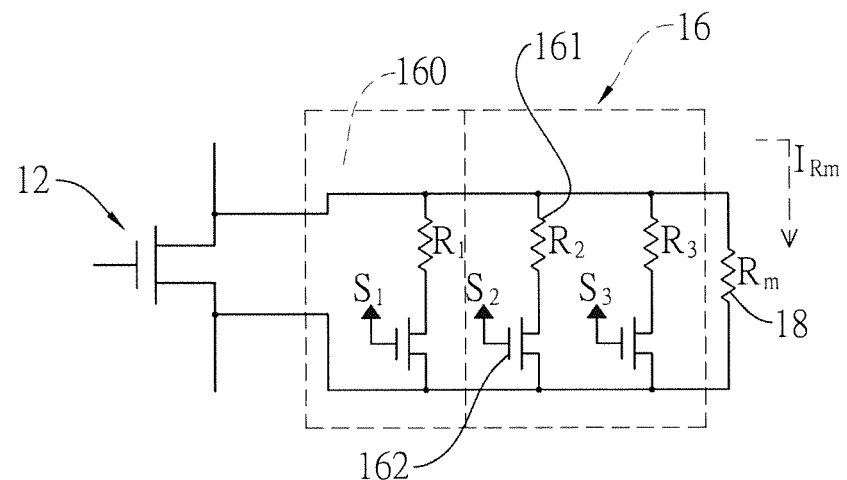
FIG. 6B shows a by-pass current of the fourth embodiment of FIG. 5, wherein the voltage-controlled transistor and the control transistors have been turned off.

With reference to FIGS. 6A and 6B, when the current regulating unit 15 detects that an abnormal high voltage at the power loop is greater than the cut-off voltage, the current regulating unit 15 turns off the voltage-controlled transistor 12 and all control transistors 162. However, a by-pass current still flows through the by-bass resistors 18, whereby the current regulating unit 15 can continuously monitor the voltage at the power loop via the detecting terminal. Once the voltage at the power loop returns to the normal state, the current regulating unit 15 will activate the voltage-controlled transistor 12 and a proper control transistor 162.

Because the by-pass current through the by-pass resistor 18 must be greater than a minimum driving current for driving the LED unit, 12, the resistance value of the by-pass resistor 18 can be determined by a withstand voltage of the voltage-controlled transistor 12 and the minimum driving current, i.e. dividing the withstand voltage by the minimum driving current. The minimum driving current for common LEDs is about 1 micro-amp to 10 micro-amps (μA), and the common withstand voltage for a transistor does not exceed 100 volts. Thus, a 10MΩ resistor or a smaller resistor can be used as the by-pass resistor 18. Since the by-pass resistor 18 is greatly larger than the shunt resistors 161, the by-pass resistor 18 barely has any influence on the power loop when the voltage-controlled transistor 12 and the control transistor 162 operate normally.

Figure 7:
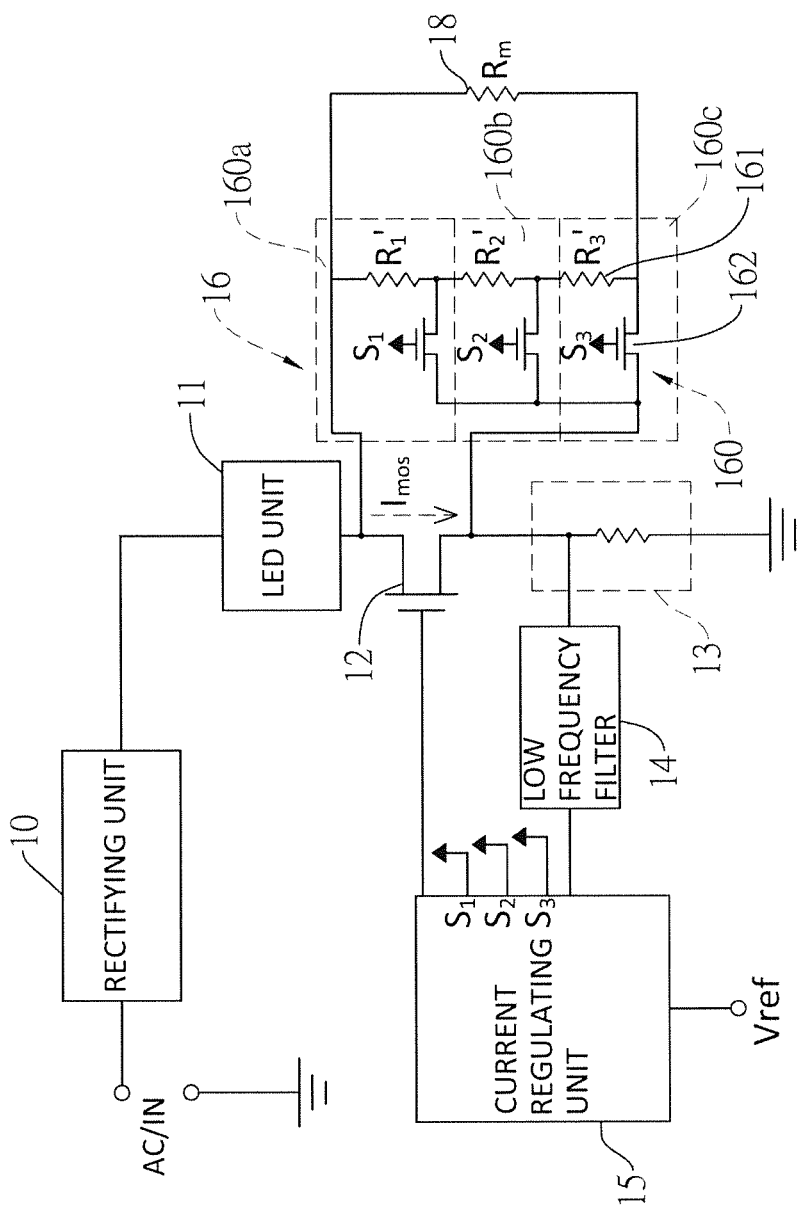
FIG. 7 shows a circuit diagram of a fifth preferred embodiment of an LED AC driving circuit of the present invention, wherein a by-pass resistor is connected to a resistance adjusting unit in parallel in accordance with the present invention.

With reference to FIG. 7, the by-pass resistor 18 is incorporated in the second embodiment of FIG. 2. One end of the by-pass resistor 18 is connected to the voltage-controlled transistor 12 and the resistance adjusting unit 16. The other end of the by-pass resistor 18 is connected to ground.

The circuit operation of FIG. 7 is similar to that of FIG. 5. When the current regulating unit 15 turns off the voltage-controlled transistor 12 and the control transistors 162, the by-pass current flows through the by-pass resistor 18. The current regulating unit 15 maintains to monitor the voltage at the power loop.

The foregoing embodiments as shown in FIGS. 5 and 7 provide a protection to avoid the damage to the transistors 12, 162 done by the lightning strike. When the abnormal high voltage resulting from the lightning strike occurs at the power loop, all the transistors 12, 162 are immediately turned off During the time that the transistors 12, 162 are turned off, the current regulating unit 15 still monitors the voltage state of the power loop. Once the abnormal high voltage disappears, the current regulating unit 15 re-activates the voltage-controlled transistor 12 and the resistance adjusting unit 16.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An LED AC driving circuit capable of adjusting operating voltage, comprising:
   a rectifying unit receiving and converting AC power to pulsed DC power and output the pulsed DC power through an output;
   an LED unit connected to the output of the rectifying unit to form a power loop and comprising multiple LEDs;
   a voltage-controlled transistor for adjusting a loop current of the power loop, wherein the voltage-controlled transistor connects to the power loop in series and has a control terminal, a first pole and a second pole;
   a current detecting unit connecting to the power loop in series and converting the loop current to a voltage signal;
   a low frequency filter connecting to the current detecting unit and outputting a voltage based on the voltage signal;
   a resistance adjusting unit connecting to the voltage-controlled transistor and being capable of adjusting a resistance across the voltage-controlled transistor; and
   a current regulating unit having
      an input terminal receiving the voltage from the low frequency filter;
      a reference input terminal receiving a reference voltage; and
      an output terminal connected to the control terminal of the voltage-controlled transistor;
   wherein the current regulating unit compares the voltage from the low frequency filter with the reference voltage to produce a control signal applied to the control terminal of the voltage-controlled transistor for stabilizing the loop current, and detects operating power of the voltage-controlled transistor for controlling the resistance adjusting unit to change the resistance across the voltage-controlled transistor.

2. The LED AC driving circuit as claimed in claim 1, wherein the resistance adjusting unit has multiple current shunting units and each current shunting unit comprises:
   a control transistor having a first pole, a second pole, and a control terminal for turning on and off the control transistor; and
   a shunt resistor connecting to the control transistor;
   wherein the current regulating unit further comprises:
   a detecting terminal connected to the power loop; and
   multiple switching terminals respectively connected to the control terminals of the control transistors of the current shunting units for turning on and off the control transistors.

3. The LED AC driving circuit as claimed in claim 2, wherein the current shunting units are connected in parallel;
   each shunt resistor connects its first end to the first pole of the respective control transistor, and connects its second end to the first pole of the voltage-controlled transistor;
   wherein the second poles of all the control transistors and the voltage-controlled transistor are connected together.

4. The LED AC driving circuit as claimed in claim 2, wherein
   the shunt resistor of a first one of the current shunting units is connected between the first pole of the voltage-controlled transistor and the first pole of the control transistor of the same current shunting unit; and
   each of other shunt resistors is connected between the first poles of two adjacent control transistors of the same current shunting unit and the subsequent current shunting unit, whereby all the shunt resistors are connected in series.

5. The LED AC driving circuit as claimed in claim 3, wherein a cut-off voltage is set in the current regulating unit and a by-pass resistor is connected in parallel to the voltage-controlled transistor and the resistance adjusting unit;
   wherein the current regulating unit turns off the voltage-controlled transistor and the resistance adjusting unit when a voltage of the power loop is greater than the cut-off voltage.

6. The LED AC driving circuit as claimed in claim 4, wherein a cut-off voltage is set in the current regulating unit and a by-pass resistor is connected between the first pole of the voltage-controlled transistor and ground;
   wherein the current regulating unit turns off the voltage-controlled transistor and the resistance adjusting unit when a voltage of the power loop is greater than the cut-off voltage.

7. The LED AC driving circuit as claimed in claim 2, wherein the detecting terminal of the current regulating unit is connected to a node at which the LED unit and the voltage-controlled transistor are connected in series.

8. The LED AC driving circuit as claimed in claim 3, wherein the detecting terminal of the current regulating unit is connected to a node at which the LED unit and the voltage-controlled transistor are connected in series.

9. The LED AC driving circuit as claimed in claim 4, wherein the detecting terminal of the current regulating unit is connected to a node at which the LED unit and the voltage-controlled transistor are connected in series.

10. The LED AC driving circuit as claimed in claim 2, wherein the detecting terminal and the input terminal of the current regulating unit are the same terminal.

11. The LED AC driving circuit as claimed in claim 3, wherein the detecting terminal and the input terminal of the current regulating unit are the same terminal.

12. The LED AC driving circuit as claimed in claim 4, wherein the detecting terminal and the input terminal of the current regulating unit are the same terminal.

13. The LED AC driving circuit as claimed in claim 2, wherein the detecting terminal and the output terminal of the current regulating unit are the same terminal.

14. The LED AC driving circuit as claimed in claim 3, wherein the detecting terminal and the output terminal of the current regulating unit are the same terminal.

15. The LED AC driving circuit as claimed in claim 4, wherein the detecting terminal and the output terminal of the current regulating are the same terminal.

16. The LED AC driving circuit as claimed in claim 2 further comprising:
   a power detecting resistor connected between the voltage-controlled transistor and the current detecting unit;
   the current regulating unit further having:
      a second detecting terminal connected to a node between the voltage-controlled transistor and the power detecting resistor; and
      a third detecting terminal connected to a node between the LED unit and the voltage-controlled transistor.

17. The LED AC driving circuit as claimed in claim 3 further comprising:
   a power detecting resistor connected between the voltage-controlled transistor and the current detecting unit;
   the current regulating unit further having:
      a second detecting terminal connected to a node between the voltage-controlled transistor and the power detecting resistor; and
   a third detecting terminal connected to a node between the LED unit and the voltage-controlled transistor.

18. The LED AC driving circuit as claimed in claim 4 further comprising:
   a power detecting resistor connected between the voltage-controlled transistor and the current detecting unit;
   the current regulating unit further having:
      a second detecting terminal connected to a node between the voltage-controlled transistor and the power detecting resistor; and
   a third detecting terminal connected to a node between the LED unit and the voltage-controlled transistor.

19. The LED AC driving circuit as claimed in claim 1, wherein the low frequency filter is a digital filter.

20. The LED AC driving circuit as claimed in claim 17, wherein the digital filter is a down-sampling filter.

* * * * *